United States Patent Office.

JOHN ABSTERDAM, OF NEW YORK, N. Y.

Letters Patent No. 99,805, dated February 15, 1870.

---

IMPROVED PROCESS OF WELDING CAST OR BESSEMER STEEL.

---

The Schedule referred to in these Letters Patent and making part of the same.

---

*To all whom it may concern:*

Be it known that I, JOHN ABSTERDAM, of the city, county, and State of New York, have invented a new and improved Process of Welding Cast or Bessemer Steel; and I do hereby declare the following to be a full, clear, and exact description thereof, which will enable those skilled in the art to make and use the same.

My present invention is intended to facilitate the operation of uniting one or more plates or bars of cast or Bessemer steel with one or more plates of wrought iron. It is also to facilitate the operation of uniting two or more bars or slabs of old Bessemer-steel rails, or other cast-steel scraps, for rerolling it into merchantable bars, sheets, or slabs.

The invention consists in placing between the bars or plates of cast or Bessemer steel and the bar or plate of iron which are to be united, a thin body of steel of cementation, puddled steel, or case-hardened iron, in such a manner that said body of steel of cementation, puddled steel, or case-hardened iron, forms an intermediate welding metal, which acts as a soldering agent in uniting the plates of cast or Bessemer steel with each other, or with the plate or plates of iron.

It consists, also, in placing between bars or plates of old Bessemer rails, or other cast-steel scraps which are to be united, a thin body of steel of cementation, puddled steel, or case-hardened iron, in such a manner that such body of steel of cementation, puddled steel, or case-hardened iron also forms an intermediate welding metal in uniting the whole into one solid mass.

In carrying out my invention I take the plates of cast or Bessemer steel which are to be united, and interpose between them a thin plate of steel of cementation, or of puddled steel, or of case-hardened iron, then I heat the whole pile to welding heat, and unite the same by hammering or rolling.

If it is desired to unite a plate or plates of cast or Bessemer steel with a plate or bars of wrought iron, the process is substantially the same, with that exception, that the iron portion of the pile must be heated to a white welding heat, the steel portion being protected against being overheated by a bed of sand or clay, in the usual manner.

Instead of simply interposing the plate of steel of cementation, puddled steel, or case-hardened iron, loosely between the plates to be united, it may be previously united to a plate of cast or Bessemer steel, by hammering or rolling, or by any other suitable means, and then placed upon the plate of cast or Bessemer steel, or of wrought iron, and treated as above stated.

This process is applicable to all articles where cast or Bessemer steel is to be united to cast or Bessemer steel or to wrought iron, the interposed body of steel of cementation, puddled steel, or case-hardened wrought iron acting as a uniting medium, whereby the welding operation is rendered feasible without destroying the cast or Bessemer steel.

In order to prevent the overheating of the cast or Bessemer steel in the welding operation, I sometimes insert the bar or slab or slabs of cast or Bessemer steel between two plates of case-hardened iron, which protects the steel from the flame of the furnace, and then weld the whole into one bar, slab, or sheet, as the case may require.

In the absence of bars or sheets of puddled steel, cemented steel, or case-hardened iron, I introduce between the steel and iron to be welded filings or fine trimmings of cemented steel, puddled steel, or case-hardened iron; or I take wrought-iron filings or fine wrought-iron borings, and cement them with some carbonaceous substance in the same manner as wrought iron is now converted or case-hardened. Said filings will act as an intermediate welding metal between the cast or Bessemer steel and the wrought iron.

From these bars, slabs, or sheets of combined cast-steel and iron I make railroad bars with steel heads, by placing in the rail pile a slab or bar of the combined metal, and piling or fagoting the iron against the iron side of the combined bar in such a manner that, in rolling the rail pile, the cast or Bessemer steel forms the head of the rail; and in welding or rerolling old Bessemer-steel bars in the manner before mentioned, I roll or hammer the same into head-bars or slabs, for making steel-headed rails or I roll the whole directly into a solid steel rail.

I also use it for wagon-tires, and for horseshoes, and various other purposes. And of this combined metal I also use for armor-plates, for building bridges, and for building vessels. I roll it also into sheets for various purposes; and it is also a good metal for constructing car-wheels, and for the wheels of field artillery.

What I claim as new, and desire to secure by Letters Patent, is—

The within-described process of welding cast or Bessemer steel to cast or Bessemer steel, either old or new, or to wrought iron, by placing between the surfaces to be united a thin plate or layer of steel of cementation, puddled steel, or case-hardened wrought iron, and treating the pile as set forth.

Also, a bar or slab, or sheet, composed of either two or more bars of cast or Bessemer steel, either old or new, or of a bar of cast or Bessemer steel and a bar of iron, united by the agency of an interposed plate or layer of steel of cementation, puddled steel, or case-hardened iron, substantially in the manner herein set forth.

This specification signed by me this 19th day of January, 1870.

JOHN ABSTERDAM.

Witnesses:
W. HAUFF,
E. F. KASTENHUBER.